Patented Nov. 4, 1947

2,429,998

UNITED STATES PATENT OFFICE 2,429,998

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 2, 1945, Serial No. 586,264

8 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprises fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, is of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The new material or composition of matter herein described, consists of an ester derived by esterification reaction between (a) An oryalkylated heat-polymerized triethanolamine, or the like; and (b) Certain dicarboxy acids hereinafter described.

It is well known that aminoalcohols, particularly tertiary aminoalcohols, react with high molal acids, such as higher fatty acids or their equivalents, to yield esters having basic properties provided that there is no negative group such as an acyl radical or aryl radical directly attached to the amino nitrogen atom. For instance, the reaction involving diethyl ethanolamine and stearic acid may be shown in the following manner:

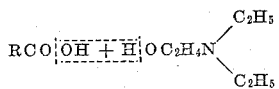

If, however, triethanolamine is substituted for diethyl ethanolamine, the same comparable reaction is illustrated in the following manner:

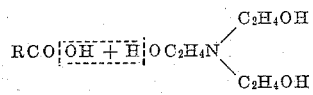

The reaction is generally conducted at fairly high temperatures, for instance, temperatures sufficient to drive off water yet below the point of pyrolysis, for example, 150° to 250° C. Under such conditions, the use of triethanolamine, or a similar polyhydroxylated reactant, may involve etherification, as well as esterification. Thus, it frequently happens that such a reaction or series of reactions, when triethanolamine or the like is used, may not be quite as simple as above indicated.

The dicarboxy acids herein contemplated as reactants or their equivalents, such as their ethyl or methyl esters, are obtained by the polymerization, and principally, the dimerization of esters of unsaturated fatty acids, particularly conjugated diethylenic acids. Such dimerized acids or their esters are well known compositions and have been used for various processes, such as the manufacture of a resinous or synthetic coating material sold under the descriptive name of "Norelac," which, in turn, is obtained by reaction between such dimerized compounds and certain diamines. (See Oil and Soap, volume 21, No. 4, page 101.)

The chemistry of polymerization has been discussed in the literature, but for convenience, reference is made to U. S. Patent No. 2,347,562, dated April 25, 1944, to Johnson, where the following appears:

"1(a) 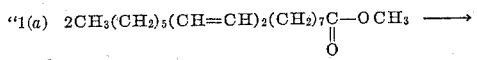

2 moles methyl ester 9,11-octadecadienic acid (originally present and/or formed by isomerization of 9,12 isomer)

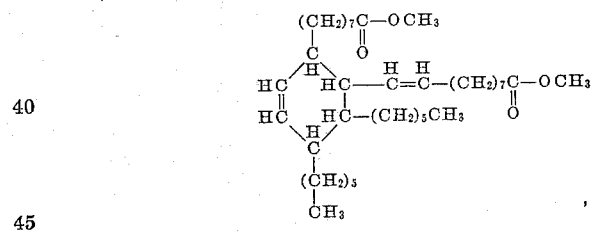

As to the preparation of such polymerized acids or esters, it is to be noted that any polyene fatty acid or its ester may be employed as a raw material. In fact, one may use a mixture such as one which occurs naturally in various drying oils. The most important of these are the octadecadienic or octadecatrienic fatty acids or their esters, but the polymeric fatty acids containing 20, 22 and 24 carbon atoms found in fish oils are also suitable.

Examples of the polyene fatty acids, the esters of which are polymerized, are the following: 9,11- and/or 9/12 - octadecadienic acids (obtainable from perilla oil, linseed oil and other drying oils) both alpha- and beta-eleostearic acids (obtainable from tung oil), etc.

If esters of the polyene fatty acids be employed, such esters may be produced by direct esterification of the fatty acids with the alcohol which has been selected, but it is generally more economical and more convenient to produce the esters by mixing the alcohol with a natural drying oil, together with a trace of alkali hydroxide, hydrogen chloride, or other esterification catalyst, and thereby effect an alcoholysis or ester interchange by simply heating.

Ordinarily speaking, polymerization is conducted so as to obtain a comparatively high conversion from the monomeric state to the polymeric state, even though some polymers higher than the dimeric state may be produced, for instance, trimers or teteramers. If desired, such polymers can be separated from each other, insofar that the dimers can be separated from the higher polymers, such as the trimers or tetramers. The method employed involves selective solvent action, but does not require further description, for the reason that there is no objection to the moderate presence of higher polymers along with the dimers herein contemplated for reaction, and if polymerization is conducted under comparatively mild conditions so as to polymerize not over fifty percent of the polyene acid esters, then and in that event, the product obtained is principally the dimeric product. In any event, this is immaterial, for the reason that the dimeric products, either in the form of the ethyl or methyl ester or the acids themselves, may be purchased in the open market at the present time.

It may be well, however, to indicate briefly the general conditions of polymerization. If methyl or ethyl esters of the polyene acids be utilized, it has been found that temperatures between about 250° C. and about 350° C. are suitable for the polymerization. The time required for this polymerization varies not only with the temperature, but with the acid and the particular ester which is used. Generally, a period of from about one-half hour to about 50 hours is suitable, and in most instances, the polymerization may be effected in not over 12 hours. Dimerization can usually be accomplished in approximately one-half this period of time. If a conjugated unsaturated ester, such as the methyl ester of eleostearic acid be employed, a sufficient degree of polymerization may be obtained within one-half to one hour at about 300° C., whereas, the methyl linolenates and linoleates generally require from about 5 to 12 hours or more. To speed up the polymerization process, suitable catalysts may be added, examples of which are: Fuller's earth (preferably acid-treated), bentonite (preferably acid-treated), stannic chloride, etc. If catalysts be employed, it is sometimes possible to use lower temperatures and shorter periods of time, or shorter periods of time, than those indicated above.

In general, it is preferred to conduct the polymerization in an inert atmosphere of carbon dioxide, nitrogen or other inert gas. The polymerization is preferably continued until the refractive index, density and average molecular weight approach constant values. At this point, the polymerized esters are separated from the unpolymerized esters by any suitable method. In subsequent examples, there is suggested the separation of these esters by distilling off the unpolymerized esters at an absolute pressure of about 1–5 mm. of mercury and at temperatures up to about 300° C. Another way in which this separation may be effected, is by extraction with methanol or other suitable solvent. Generally, the result of polymerizing yields about 30% to 75% of the polymeric esters. As indicated previously, if the reaction is conducted so as to obtain mild polymerization, and less than 50% of the product in the polymeric state, it will be found the bulk, if not all, are readily obtainable in the dimeric state.

Previous attention has been directed to the fact that the esters of any polyene higher fatty acid may be employed or mixtures thereof. Polymerization of the kind indicated is concerned largely with conjugated polyene structure. Previous reference has been made to such acid esters as show such structure. However, the fact that any polyene ester may be employed as a raw material for the manufacture of the herein contemplated reactants, is due to the fact that such materials can be isomerized to the conjugated structure. It is well known that alkali metal hydroxides act on conjugated fatty acid and oils in either aqueous or alcoholic solutions. Procedures are available which enable the conversion of 30% to 50% of conjugated acids from soybean and linseed oils. See Industrial and Engineering Chemistry, volume 34, page 237, and U. S. Patent No. 2,350,583, dated June 6, 1944, to Bradley. Thus, the raw materials herein contemplated include, among others, the isomerized fatty acids, or esters obtained from unsaturated higher fatty acids having at least two non-conjugated double bonds. Such materials are obtainable, for example, from linseed oil, soyabean oil, perilla oil, poppyseed oil, cottonseed oil, sunflowerseed oil, and a number of fish oils. The fatty acids, prior to isomerization, generally have an iodine number of 110, or substantially higher.

A further description of polymeric fatty acids and their compounds is found in U. S. Patent No. 2,357,839, dated September 12, 1944, to Manley & Evans. Note that in said patent such acid is referred to as a "polymeric fat acid." By analogy the dimeric acid would be referred to as "dimeric fat acid."

From a practical standpoint, two other facts are of marked interest. There is now available a solvent treated dehydrated castor oil or fatty acid derivative in which the 9,11 isomer is present to the extent of approximately 85%. This commercial product is particularly desirable as a reactant for preparation of the herein contemplated compounds. Another factor of interest is recognition of the effectiveness of certain catalysts in converting non-conjugated unsaturated fatty oils or acids so as to result in the conjugated isomer. For instance, see Oil and Soap, volume 21, No. 11, page 329.

POLYMERIZED ESTER

*Example 1*

800 parts of the methyl esters of tung oil fatty acids are heated, preferably in an atmosphere of carbon dioxide or other inert gas, to a temperature of about 275° C. in approximately 40 minutes, and the temperature is maintained at this point for about one-half an hour. The relatively volatile and unpolymerized esters are removed by distillation at about 1–5 mm. of mercury absolute pressure, the temperature being gradually raised to about 300° C., leaving a residue containing 365-380 parts of non-volatile polymerized esters.

POLYMERIZED ESTER

Example 2

1000 parts of the methyl esters of the fatty acids of a solvent treated dehydrated castor oil, the major proportion, for instance, 80 to 85%, of which contains the methyl ester of 9,11- and 9,12-octadecadienic acid, are polymerized at 300° C. for about 3 hours in an inert atmosphere. The volatile and unpolymerized esters are removed by distillation at 1–5 mm. of mercury absolute pressure, the temperature being gradually raised to about 300° C., leaving as a residue about 450–460 parts of non-volatile polymerized esters.

POLYMERIZED ESTER

Example 3

2000 parts of the methyl esters of the fatty acids of soyabean oil are mixed with 200 parts of activated bentonite ("Super-Filtrol") and the mixture is heated, preferably in an inert atmosphere at about 280° C. for about one half an hour. The product is filtered and the volatile and unpolymerized esters are removed by distillation at 1–5 mm. of mercury absolute pressure, the temperature being gradually raised to about 300° C., leaving as a residue about 835–840 parts of polymerized esters.

The second class of reactants employed in the manufacture of the compounds, used for example, as demulsifiers in demulsification process herein described, consist of oxyalkylated surface-active heat-polymerized aminoalcohols, of which, in monomeric form, are secondary or tertiary amines containing at least two alkanol or hydroxyalkyl radicals.

Briefly stated, such compounds may be obtained by the polymerization of triethanolamine, tripropanolamine, or the like, in such a manner as to eliminate water and produce ether linkages. Such polymers, consisting of tetramers or more highly polymerized forms, such as pentamers, hexamers, etc., and including decamers, or even more highly polymerized forms, are characterized by showing surface-activity. This means their dilute solutions have the ability to cause foam, to reduce the surface tension of water, to act as emulsifiers, etc. The exact composition cannot be depicted by the usual chemical formulae, for the reason that the structures may be cyclic or acyclic, or both, and subject to wide variations. The primary reaction is unquestionably etherization, although if some secondary amine as, for example, diethanolamine, dipropanolamine, or the like is present, it is barely possible that water is also eliminated to some degree by a reaction other than etherization, with the result that two nitrogen atoms are united by an alkylene radical, as distinguished from an alkyleneoxyalkylene radical.

Even though the exact structure of the surface-active heat-polymerized alkanolamines herein contemplated is not fully understood, it is to be noted that their method of manufacture is well known and that they are used commercially for various purposes. The hereinafter included description is typical of the conventional polymers. The alkanolamines having a single nitrogen atom, i. e., monoamines, and particularly those which represent secondary or tertiary amines, may be contemplated in their simplest aspect as oxyalkylated derivatives of ammonia. For example, even though diethanolamine and triethanolamine may be manufactured in various ways, such compounds can be manufactured by treating one mole of ammonia with two or three moles of ethylene oxide. Analogs are prepared by the use of other alkylene oxides containing a reactive ethylene oxide ring, as, for example, propylene oxide, butylene oxide, glycide or methylglycide. Such products need not be derived directly from ammonia, but may be derived from primary amines containing an aliphatic radical having 6 carbon atoms or less, as, for example, methylamine, ethylamine, propylamine, butylamine, amylamine, and hexylamine.

It is to be noted that if a product like triethanolamine is treated with an excess of an oxyethylating agent, for instance, ethylene oxide, one introduces the oxyethylene radical between the terminal hydrogen atom and the adjacent oxygen atom. Thus, ether-aminoalcohols obtained by reacting triethanolamine or tripropanolamine with one or two, or even with three to nine moles of ethylene oxide, are well known. The other similar etheraminoalcohols are derived in the same manner and require no further description. For purposes of clarity the secondary or tertiary amines herein contemplated as raw materials or reactants for polymerization, may be summarized by the following formula:

wherein OR is an alkylene oxide radical having 4 carbon atoms or less, and preferably, is the ethylene oxide radical. As indicated, OR may be the propylene oxide radical, the butylene oxide radical, the glycide radical, or the methyl glycide radical; $R_1$ is a member of the class consisting of hydrogen atoms and alkyl radicals having 6 carbon atoms or less; $m$ represents a numeral varying from 0 to 3; $n$ represents the numeral 2 or 3; and $n'$ represents the numeral 0 or 1, with the proviso that $n$ plus $n'$ equals 3.

Previous reference has been made to the fact that one may use a secondary or tertiary amine as a raw material. We prefer to use a tertiary amine, and particularly a tertiary amine containing 3 alkanol radicals; more specifically, we particularly prefer to use triethanolamine, and find that the commercially available product is suitable, in spite of the fact that it contains moderate amounts of diethanolamine, and possibly smaller amounts of monoethanolamine. It has been previously pointed out that the amino hydrogen atoms, as distinguished from the alcoholic hydrogen atom, may enter into the polymerization reaction without affecting the suitability of the final polymer. It will be pointed out subsequently that the temperature employed for polymerization are, for instance, in the neighborhood of 250° C.

This means that in most instances monoethanolamine or diethanolamine, if present originally, may be volatilized and lost before an opportunity presents itself for polymerization. We have found no significant difference, for example, whether a polymer has been obtained from chemically pure triethanolamine substantially free from diethanolamine and monoethanolamine, or from commercial triethanolamine having minor percentages of the primary or secondary amine present.

In the examples hereinafter included, it is noted that the polymer must represent the tetrameric stage, or a higher degree of polymerization and must be surface-active in the conventional sense previously referred to. The products obtained in the manner herein described, when manufactured in iron vessels, represent viscous deep-amber-colored products. The degree of polymerization can be estimated approximately in the usual manner by loss of water and increase in viscosity. However, it is better to make an actual molecular weight determination in the usual manner. In any event, a determination which shows surface-activity means that the product is at least in the tetrameric state, and if the product is heated for some period of time after it has shown surface-activity with further loss of water and with further increase in viscosity, obviously the degree of polymerization, as far as the average polymer goes, must be beyond or higher than the trimeric state.

The polymerization of the basic hydroxy amines is affected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats and the like. The proportion of catalyst employed may vary from slightly less than 0.1% in some instances, to slightly over 1% in other instances. Needless to say, in the event the alcoholamine is low-boiling, customary precautions must be taken so as not to lose part of the reactants. On the other hand, conditions must be such as to permit the removal of water formed during the process. At times the process can be conducted most readily by permitting part of the volatile constituents to distil, and subsequently allowing the vapors to condense. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distil in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i. e., the effectiveness with which the water of reaction is removed from the combining mass. Polymerization can be effected without the use of catalysts in the majority of instances, but such procedure is generally undesirable, due to the fact that the reaction takes a prolonged period of time, and usually a significantly higher temperature. It is noted that in the subsequent examples the final compositions of matter which are contemplated are preferably polymerized hydroxylated tertiary amines. Thus, all the subsequent description of polymerized hydroxyamines has been limited largely to the tertiary type, which is obviously the preferred type. However, it must be recognized that polymerized hydroxy amines, particularly if polymerized for a fairly long period of time, at a fairly high temperature, and in the presence of an active catalyst, may result in a polymerization reaction which ends in a product that is water-insoluble, or substantially water-insoluble. Obviously, such water-insoluble material can be obtained more readily from a more highly hydroxylated amine than from a lower one.

The use of the word "surface-active," as herein employed and as generally used, refers to a compound which is water-soluble in the sense that it at least produces a colloidal sol or solution; thus, we do not contemplate the use of products obtained by polymerization to the degree that they are no longer soluble or miscible in water, except as hereafter specified.

Incidentally, it must also be recognized that the speed of reaction and the degree of polymerization are commonly affected by the nature of the vessel in which the reaction takes place. In the examples cited, it is intended that reaction take place in a metal vessel, such as iron. However, in order to obtain the same degree of polymerization, when conducting the reaction in a glass-lined vessel, it is quite likely that the period of reaction would have to be increased 150–400%.

Suitable amines have been previously indicated, but the following may be noted in addition: Propylpropanolamine, cyclohexyldiethanolamine, cyclohexyldipropanolamine, etc.

Other well known amines which may be employed are the following:

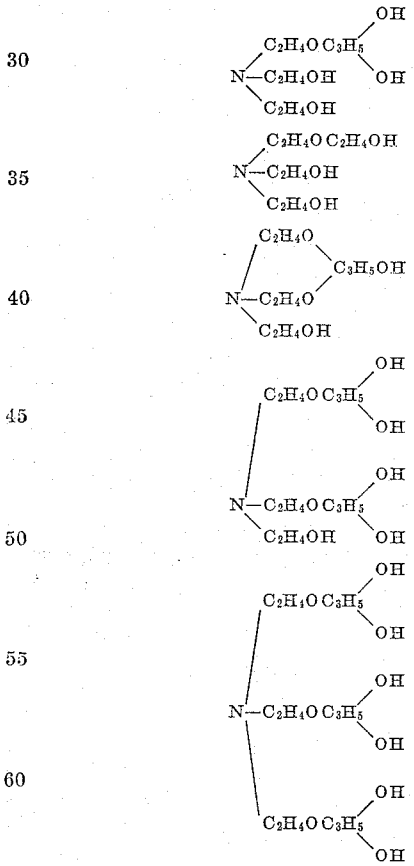

(See U. S. Patent No. 2,290,415, dated July 21, 1942, to De Groote.)

HEAT-POLYMERIZED HYDROXYAMINE

*Example 1*

1% of caustic soda is added to commercial triethanolamine and the product heated for approximately 3 hours at 245–260° C. The mass is stirred constantly, and any distillate is condensed and reserved for re-use after an intermediate re-running step for purposes of dehydration. At the end of approximately 2½ to 3½ hours, the molecular weight determination shows that the material is largely dimeric.

HEAT-POLYMERIZED HYDROXYAMINE
Example 2

The same procedure is employed as in the previous example, except that heating is continued for approximately another 1½ hours. In this instance, the reaction mass is largely a polymeric material, with an average molecular weight range indicating the presence of approximately four to five nitrogen atoms in the polymer.

HEAT-POLYMERIZED HYDROXYAMINE
Example 3

The same procedure is followed as in Example 2, except that a slightly higher temperature, approximately 10° higher, is employed, and a somewhat longer time of reaction, for instance, ½ to 1½ hours longer than in Example 2, preceding. In any event, the reaction is continued until the product obtained either as such, or in the form of the acetate, dissolves or disperses in water in concentrations from 0.1% to 1% to give a foamy solution indicating high surface-activity.

HEAT-POLYMERIZED HYDROXYAMINE
Example 4

Tri-isopropanolamine is substituted for tri-ethanolamine in Examples 1, 2 and 3.

HEAT-POLYMERIZED HYDROXYAMINE
Example 5

Tripentanolamine is substituted for triethanolamine in Examples 1, 2 and 3.

HEAT-POLYMERIZED HYDROXYAMINE
Example 6

Polyethanolamine of the following formula:

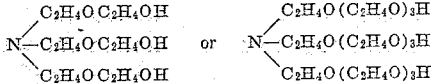

is substituted for triethanolamine in the previous examples.

The entire invention can be applied in an overwhelming majority of instances if one has available only three types of heat-polymerized commercial triethanolamine. One type contemplates the polymerization which approximates on the average the pentameric form, i. e., the tetrameric through the hexameric form. The second type represents the next higher polymerization, which in the bulk, approximates a heptameric state through the nonameric state. The third class represents in the bulk the decameric and somewhat higher states through and including, for example, the dodecameric state. These three grades or types or varieties of polymers of commercial triethanolamine are economical in cost, easy to prepare, and really are the outstanding reagents for employment in the present process.

It is to be noted that Example 1, preceding, is concerned with the manufacture of a dimeric form. This is included, for the reason that it is sometimes convenient to produce the dimeric or trimeric form, and then subsequently, polymerize to a degree showing a considerably increased molecular weight. Thus, at times such interrupted operation may show some convenience in comparison with a single polymerization step.

As previously stated, the raw material subjected to oxyalkylation, and particularly oxyethylation, is a heat-polymerized, surface-active, water-soluble amine condensate, as described in detail previously. We much prefer to use heat-polymerized condensation products derived from commercial triethanolamine. Furthermore, it must be remembered that the final criterion of the degree of polymerization, especially initial state, is dependent upon an actual molecular weight determination, or an equivalent test, rather than based simply on time of reaction.

It is obvious that one cannot polymerize a material such as diethylethanolamine and have a suitable material for subsequent oxyalkylation. One may, of course, employ a heat-polymerized product obtained from an admixture of reactants in which a compound such as diethylethanolamine is one ingredient or reactant.

It is obvious that proper selection of reagents will invariably yield a final product in which amino hydrogen atoms or hydroxyl radicals are present, i. e., a material susceptible to oxyalkylation. Indeed, if there is any doubt as to the suitability of a heat-polymerized product, it can be readily subjected to treatment with ethylene oxide in a laboratory autoclave and its reactivity noted. If it is not reactive to ethylene oxide, it would not be a satisfactory reactant.

The treatment of amines, whether they be primary or secondary amines, with ethylene oxide, is well known. The effect of such reaction is to convert such primary or secondary amines into tertiary amines having an alkylol radical or its equivalent. Obviously, then, a tertiary amine containing an alkylol group or its equivalent is readily susceptible to oxyalkylation. Briefly stated, such oxyalkylation of reactive amines, particularly when ethylene oxide is used as the oxyalkylating agent, can be conducted under comparatively mild conditions, such as temperatures of 125° C. to 200° C. under pressure of 80 lbs. to not over 200 pounds. In using ethylene oxide, such reaction is generally complete within three to five hours. When other oxyalkylating agents are used, which are less reactive than ethylene oxide, for instance, propylene oxide, more effective or drastic conditions of reaction may be required, such as longer period of reaction, increased temperature, increased pressure, etc.

As to suitable oxyalkylating agents, we particularly prefer to use ethylene oxide, propylene oxide, butylene oxide, glycide and methyl glycide.

OXYALKYLATED POLYMERIZED HYDROXYAMINE
Example 1

One pound mole of a material of the kind described under heading "Polymerized hydroxyamine, Example 2," is treated with three pound moles of ethylene oxide at a maximum pressure of approximately 100 pounds, and at a temperature of approximately 125° C. until reaction is complete, as indicated by substantially complete absorption of ethylene oxide.

OXYALKYLATED POLYMERIZED HYDROXYAMINE
Example 2

The same procedure is followed as in Example 1, immediately preceding, except that six pound moles of ethylene oxide are employed for each pound mole of heat-polymerized amine.

OXYALKYLATED POLYMERIZED HYDROXYAMINE
Example 3

The same procedure is followed as in Example 2, immediately preceding, except that instead of employing six pound moles of ethylene oxide for reaction with one pound mole of the polymerized amine, one employs instead nine pound moles of ethylene oxide.

OXYALKYLATED POLYMERIZED HYDROXYAMINE

Example 4

The same procedure is followed as in immediately preceding Examples 1 to 3, inclusive, except that heat-polymerized hydroxyamines exemplified by "Heat-polymerized hydroxyamine, Examples 3 to 6, inclusive," are employed instead of the material exemplified by "Heat-polymerized hydroxyamine, Example 1."

OXYALKYLATED POLYMERIZED HYDROXYAMINE

Example 5

The same procedure is followed as in Examples 1 to 4, immediately preceding, except that propylene oxide is substituted for ethylene oxide.

It will be noted that in the preceding examples no attempt has been made to remove the alkaline catalyst which may generally be present during the heat-polymerization of the hydroxyamine, which catalyst appears to accelerate oxyethylation.

The oxyalkylated and heat-polymerized triethanolamine or similar reactants have substantially the same appearance after oxyalkylation, particularly oxyethylation, as prior thereto, except that they are apt to be somewhat thinner and less resinous in character. The color is usually dark reddish or amber.

There is no need to change the dicarboxy acid esters to the acids. One may employ the methyl or ethyl esters for reaction with triethanolamine, heat polymerized triethanolamine or oxyethylated heat-polymerized triethanolamine. In such reaction a low molal alcohol, to wit, methyl or ethyl alcohol, is eliminated instead of water. This may be shown in a manner comparable to a previous reaction in the following way:

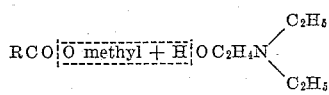

saponification of the ethyl and methyl ester, followed by acidification, yields the free acids. In some of the subsequent reactions one need not necessarily unite both carboxyl radicals with the amine radical. In other words, the reaction can be conducted between the dicarboxy compound and the polyhydroxylated amine so as to eliminate only one mole of water, or one mole of methyl alcohol or ethyl alcohol. We have found that the type of compound wherein any carboxyl radical not esterified with an aminoalcohol group, or its equivalent, is in a free form, or unreacted form, yields a better demulsifier than the corresponding ester form. The reason probably resides in the fact that the carboxyl may unite electrovalently with an amine which is part of the same molecule, thus forming an inner salt or a compound comparable thereto, or possibly with an amine residue which is part of another molecule, and thus, promote association. The corresponding ester radical would not participate in such modification.

AMINOESTER

Example 1

Four separate batches of heat-polymerized triethanolamine corresponding, roughly, to a tetramer and manufactured in a manner previously described under the heading "Heat-polymerized hydroxyamine, Example 2," are treated with approximately 3, 6, 10 and 15 molecular proportions of ethylene oxide. Assuming the molecular weight of the tetramer to be 675, one can conveniently treat four batches of the tetramer equal to 675 pounds each with 150, 300, 400 and 675 pounds of ethylene oxide. The result represents 825, 975, 1075 and 1350 pounds of the oxyethylated derivative.

1 pound mole of a dimerized soyabean fatty acid corresponding to the following formula:

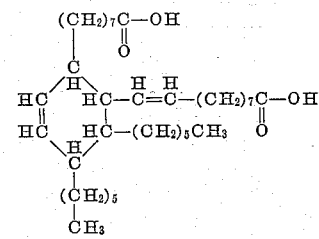

and having a molecular weight of 560, is reacted in the conventional manner with 1 pound mole (825 lbs.) of the 1:3 oxyethylated derivative previously described. The reaction is conducted at approximately 175° to 225° for approximately 1½ to 2 hours, until 1 pound mole of water is eliminated. The reaction is conducted with constant stirring and with elimination of the water of formation. The procedure is substantially the same as the esterification of triethanolamine with stearic acid. The final product is a viscous amber product showing colloidal solubility in water and better solubility in presence of dilute acid.

We prefer to conduct the esterification reaction at a temperature which is distinctly lower than the temperature reaction employed in polymerization of the triethanolamine or similar hydroxyamine. The purpose of such procedure is to promote esterification, rather than any additional etherization. Such procedure has the added advantage that by collecting the water of esterification, one can estimate or measure the extent of esterification. If, however, etherization takes place at the same time, there is the disadvantage that the water collected does not necessarily represent water of esterification alone, but to some extent, represents water of etherization.

AMINOESTER

Example 2

The same procedure is employed as in the preceding example, except that the time of heating is increased to approximately 2 to 2½ hours, so as to eliminate 1½ pound moles of water.

AMINOESTER

Example 3

The same procedure is employed as in the preceding examples, except that the time of heating is increased to approximately 2½ to 3 hours, so as to eliminate 2 pound moles of water.

AMINOESTER

Example 4

The same procedure is employed as in the preceding examples, except that the time of heating is increased to approximately 4 hours, so as to eliminate more than 2 pound moles of water, i. e., to insure some additional etherization as well as esterification.

AMINOESTER

Example 5

The same procedure is employed as in Examples 1 to 4 preceding, except that the 1:6, 1:10 and 1:15 ratio oxyethylated derivative is employed instead of the 1:3 ratio oxyethylated derivative. This means that 975 pounds of the 1:6 ratio compound, 1125 pounds of the 1:10 ratio compound, and 1350 pounds of 1:15 ratio replaces 825 pounds of the 1:3 ratio employed in the first experiment.

AMINOESTER

Example 6

The same procedure is followed as in Examples 1 to 5, inclusive, except that an oxyethylated heptamer or equivalent is employed. Such product may be obtained by the oxyethylation of a product such as that described under the heading "Heat-polymerized hydroxyamine, Example 3." If one employs 945 as an average molecular weight value, and then the same amounts of ethylene oxide are added as in the previous example, 150 pounds, 300 pounds, 450 pounds, and 657 pounds, the molecular weights of the oxyethylated products then approximate 1100, 1250, 1400 and 1625. In all other respects, the products are obtained in the same manner as in Example 5.

AMINOESTER

Example 7

The same procedure is followed as in Example 5 preceding, except that one employs an oxyethylated decamer or the approximate equivalent thereof. Using a value of 1325 for the molecular weight of the decamer, it means the same ratio employed in Eaxmple 5, preceding, i. e., 1:3, 1:6, 1:10 and 1:15, giving oxyethylated derivatives in which the molecular weights correspond to 1475, 1625, 1775 and 2000. In all other respects, the products are obtained in the same manner as in Example 5.

AMINOESTER

Example 8

The dimerized acids obtained from tung oil fatty acids are employed instead of the corresponding derivative derived from soyabean oil fatty acids. Compare "Polymerized ester, Example 1," preceding, with "Polymerized ester, Example 3," preceding.

The amines contemplated for reaction with the dicarboxy acids are polyamines having basic amino radicals. Thus, they can form hydrates by contact with water or salts by combination with organic or inorganic acids, thus forming the acetate, hydroxyacetate, lactate, gluconate, propionate, caprate, phthalate, fumarate, maleate, benzoate, succinate, oxalate, tartrate, chloride, nitrate, or sulfate. The aminoester, without contact with water or acid, may of course be dissolved in an anhydrous solvent. It is to be understood that references to the aminoalcohol esters in this specification and in the claims, include the amino compounds in basic form, or in the form of salts of acids, as well as the free or anhydro forms themselves.

We desire to point out that we are aware of the fact that there are other reactants, which, at first glance, appear to bear a superficial relationship to the reactants herein contemplated. One might assume that such reactants could be employed to produce products comparable to those herein described. We have found the contrary to be true. For instance, we are aware that there are a variety of other high molal dicarboxy acids, such as sebacic acid, analogues of the same, etc. Other classes include dimers of abietic acid, etc. Acetalized ricinoleic acid is an additional example. Diels-Alder and Clocker adducts represent another type, particularly when derived from maleic anhydride, etc. We have not found such particular products could be substituted for the reactants herein described, and particularly, the dimeric acids indicated in detail. Similarly, other amines bearing a superficial resemblance to the polymeric products herein described are known. One class is obtained by the polymerization of oxyethylated polyalkylene amines, particularly those having four or five amino nitrogen atoms. We have not found such products to serve as satisfactory reactants.

The new materials or compositions of matter herein described form the subject-matter of our co-pending divisional application Serial No. 630,971, filed November 26, 1945.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for resolving petroleum emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases, which cannot be treated as easily or at so low a cost with the demulsifying agents heretofore available.

In practicing our process for resolving petroleum emulsions of the water-in-oil type, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

It may be well to note that polymerization of polyene acids is not limited to the esters, but that the acids per se may be polymerized. This fact is noted, for example, in the aforementioned Johnson U. S. Patent No. 2,347,562.

Insofar that the acid employed is dibasic, and since the oxylakylated heat-polymerized condensate is very apt to be polyhydroxylated, it is obvious that resinification takes place to a greater or lesser degree, and particularly in such instance where etherification is caused to take place along with esterification. This fact, added to what has been pointed out, previously, emphasizes the difficulty of attempting to depict the final product by any approximation of a structural formula.

One preferred and more narrow aspect of our invention, insofar as it is concerned with demulsification of petroleum emulsions of the water-in-oil type, is concerned with the admixture of the aminoester, as described, with a viscosity-reducing solvent, such as the various solvents enumerated, particularly aromatic solvents, alcohols, ether alcohols, etc., as previously specified. The word "solvent" is used in this sense to refer to the mixture if more than one solvent is employed, and generally speaking, it is our preference to employ the demulsifier in a form representing 40% to 85% demulsifier and 15% to 60% solvent, largely, if not entirely, non-aqueous and so selected to give a solution or mixture particularly adaptable for proportional pumps or other measuring devices. The following examples will illustrate this aspect of our invention:

DEMULSIFIER

Example 1

| | Per cent |
|---|---|
| Aminoester, Example 1 | 60 |
| Xylene | 30 |
| Methol alcohol | 10 |

DEMULSIFIER

Example 2

| | Per cent |
|---|---|
| Aminoester, Example 3 | 65 |
| Commercial cresol | 25 |
| Isopropyl alcohol | 10 |

DEMULSIFIER

Example 3

| | Per cent |
|---|---|
| Aminoester, Example 4 | 55 |
| Decalin | 10 |
| Cymene | 10 |
| Dichloroethyl ether | 25 |

DEMULSIFIER

Example 4

| | Per cent |
|---|---|
| Aminoester, Example 2 | 45 |
| Diethylene glycol monobutyl ether | 55 |

The above percentages are by weight.

Having thus described our invention, what we claim as new and desire to secure by Letters Patent is:

1. A process for breaking petroleum emulsions of the water-in-oil type, characterized by subjecting the emulsion to the action of a demulsifier comprising a basic aminoalcohol ester in which the aminoalcohol radical is that of an oxyalkylated surface-active heat-polymerized aminoalcohol, which is the resultant of the heat polymerization of the monomer

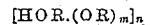

wherein OR is an alkylene oxide radical having not over 4 carbon atoms; $R_1$ is a member of the class consisting of hydrogen atoms and alkyl radicals having not over 6 carbon atoms; $m$ represents a numeral varying from 0 to 3; $n$ represents a numeral varying from 2 to 3; and $n'$ represents a numeral varying from 0 to 1, with the proviso that $n$ plus $n'$ equals 3; the radical introduced by oxyalkylation being a repetitious oxyalkylene radical in which the units have not over 4 carbon atoms, the number of said units introduced per aminoalcohol polymer being not in excess of the molal ratio of 15 to 1; and the acid radical of said aminoalcohol ester being the dimer obtained by polymerization at elevated temperature of a substance selected from the group consisting of polyene higher fatty acids and their monohydric alcohol esters; said basic aminoalcohol ester being selected from the class consisting of the anhydro base, hydrated base, and salts.

2. The process of claim 1, wherein $n'$ is zero.

3. The process of claim 1, wherein $n'$ is zero, and $m$ is zero.

4. The process of claim 1, wherein $n'$ is zero, $m$ is zero, and OR and every alkylene oxide radical is the ethylene oxide radical.

5. The process of claim 1, wherein $n'$ is zero, $m$ is zero, OR and every alkylene oxide radical is the ethylene oxide radical, and the monomeric polyene fatty acid radical has 18 carbon atoms.

6. The process of claim 1, wherein $n'$ is zero, $m$ is zero, OR and every alkylene oxide radical is the ethylene oxide radical, the monomeric polyene fatty acid radical has 18 carbon atoms, and the heat-polymerized aminoalcohol prior to oxyethylation representing the range of the tetrameric state through the hexameric state.

7. The process of claim 1, wherein $n'$ is zero, $m$ is zero, OR and every alkylene oxide radical is the ethylene oxide radical, the monomeric polyene fatty acid radical has 18 carbon atoms, and the heat-polymerized aminoalcohol prior to oxyethylation representing the range of the heptameric state through the nonameric state.

8. The process of claim 1, wherein $n'$ is zero, $m$ is zero, OR and every alkylene oxide radical is the ethylene oxide radical, the monomeric polyene fatty acid radical has 18 carbon atoms, and the heat-polymerized aminoalcohol prior to oxyethylation representing the range of the decameric state through the dodecameric state.

MELVIN DE GROOTE.
BERNHARD KEISER.

REFERENCES CITED

The following references are of record in the file of this patent:

UNITED STATES PATENTS

| Number | Name | Date |
|---|---|---|
| 2,167,346 | De Groote et al. | July 25, 1939 |
| 2,231,754 | De Groote et al. | Feb. 11, 1941 |
| 2,231,758 | De Groote et al. | Feb. 11, 1941 |
| 2,231,759 | De Groote et al. | Feb. 11, 1941 |
| 2,344,260 | Morgan et al. | Mar. 14, 1944 |
| 2,379,413 | Bradley | July 3, 1945 |